United States Patent
Narasimha et al.

(10) Patent No.: US 8,892,355 B2
(45) Date of Patent: Nov. 18, 2014

(54) NAVIGATION SYSTEM WITH POINT OF INTEREST VALIDATION MECHANISM AND METHOD OF OPERATION THEREOF

(75) Inventors: Pramod Lakshmi Narasimha, Sunnyvale, CA (US); Liviu Teodor Popescu, Sunnyvale, CA (US); Aliasgar Mumtaz Husain, Milpitas, CA (US)

(73) Assignee: Telenav, Inc., Sunnyvale, CA (US)

(*) Notice: Subject to any disclaimer, the term of this patent is extended or adjusted under 35 U.S.C. 154(b) by 111 days.

(21) Appl. No.: 13/334,011

(22) Filed: Dec. 21, 2011

(65) Prior Publication Data
US 2013/0166196 A1     Jun. 27, 2013

(51) Int. Cl.
*G01C 21/00*     (2006.01)

(52) U.S. Cl.
USPC .......................................... 701/426; 701/400

(58) Field of Classification Search
USPC .................................... 701/400, 426
See application file for complete search history.

(56) References Cited

U.S. PATENT DOCUMENTS

| | | |
|---|---|---|
| 7,486,958 B2 | 2/2009 | Sheha et al. |
| 2009/0024656 A1 | 1/2009 | Wellman |
| 2010/0114476 A1* | 5/2010 | Hsu .............................. 701/201 |
| 2010/0131187 A1 | 5/2010 | Lai et al. |
| 2010/0161215 A1* | 6/2010 | Karani ......................... 701/204 |
| 2010/0250118 A1* | 9/2010 | Bansal et al. ................. 701/204 |
| 2011/0238609 A1* | 9/2011 | Aben et al. ..................... 706/50 |

OTHER PUBLICATIONS

De Marneffe et al., "Generating Typed Dependency Parses from Phrase Structure Parses", 2006, in LREC 2006.
Daniel Jurafsky and James H. Martin, "Speech and Language Processing: An Introduction to Natural Language Processing, Computational Linguistics, and Speech Recognition", Second Edition, 2009, pp. 353-390, vol. 2, Chapter 10, Publisher: Prentice Hall, Published in: US.

* cited by examiner

*Primary Examiner* — Hussein A. Elchanti
(74) *Attorney, Agent, or Firm* — IP Investment Law Group

(57) ABSTRACT

A method of operation of a navigation system includes: selecting a search keyword; marking a point of interest as closed with the search keyword; and generating a notification with the point of interest marked as closed for displaying on a device.

20 Claims, 7 Drawing Sheets

NAVIGATION SYSTEM WITH POINT OF INTEREST VALIDATION MECHANISM AND METHOD OF OPERATION THEREOF

TECHNICAL FIELD

The present invention relates generally to a navigation system, and more particularly to a system for a navigation system with point of interest.

BACKGROUND ART

Modern portable consumer and industrial electronics provide increasing levels of functionality to support modern life including location-based services. This is especially true for client devices such as navigation systems, cellular phones, portable digital assistants, and multifunction devices.

The navigation systems generally provide a recommended route from a starting point to a desired destination. Generally, the starting point and the desired destination are selected from a large database of roads stored in mass media storage, such as a compact disc read-only memory (CD ROM) or a hard drive, which includes roads of an area to be traveled by a user.

As users adopt mobile location-based service devices, new and old usage begin to take advantage of this new device space. Navigation system and service providers are continually making improvements to enhance the user's experience in order to be competitive.

Thus, a need still remains for a navigation system with point of interest for increasing levels of functionality. In view of ease of use, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: selecting a search keyword; marking a point of interest as closed with the search keyword; and generating a notification with the point of interest marked as closed for displaying on a device.

The present invention provides a navigation system, including: a select module for selecting a search keyword; a search module, coupled to the select module, for marking a point of interest as closed with the search keyword; and a generate module, coupled to the search module, for generating a notification with the point of interest marked as closed for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
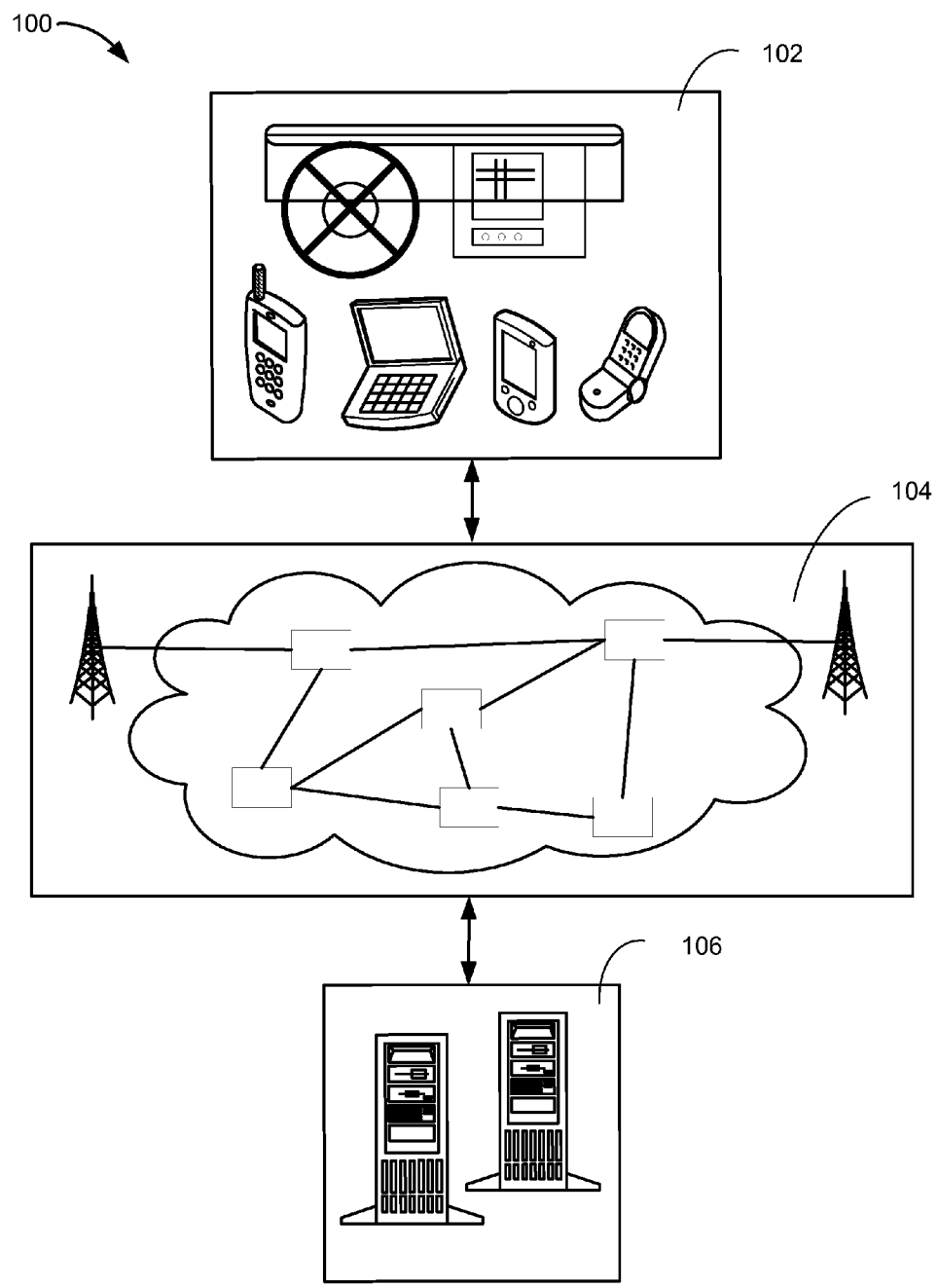
FIG. 1 is a navigation system with point of interest validation mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X,Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with point of interest validation mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
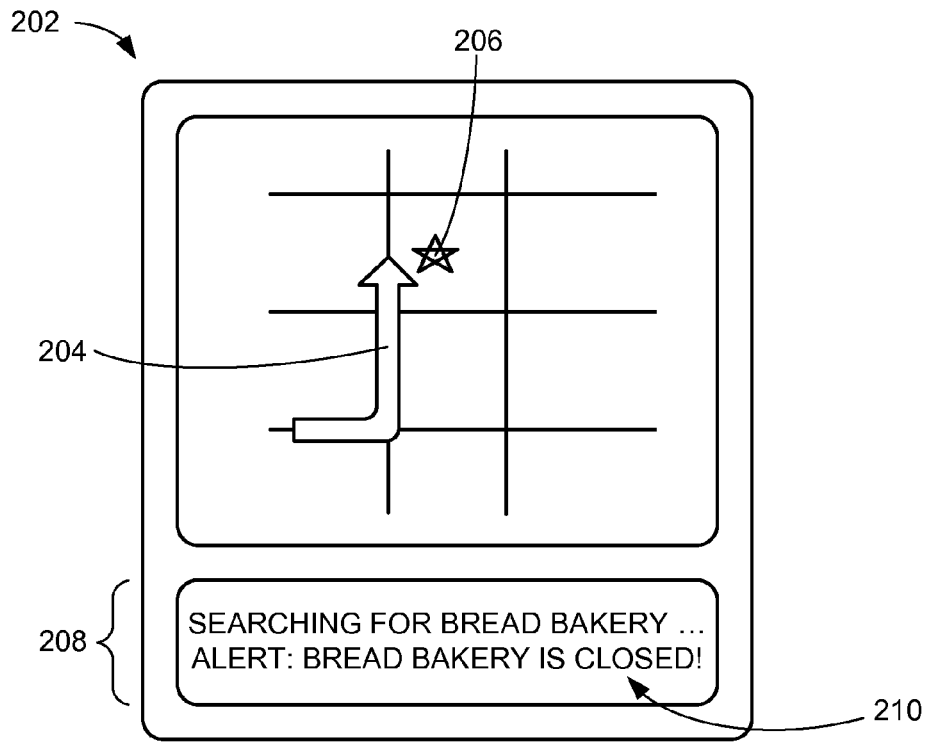
FIG. 2 is a first example of a display on a display interface of the first device of FIG. 1.

Referring now to FIG. 2, therein is shown a first example of a display on a display interface 202 of the first device 102 of FIG. 1. The display interface 202 is defined as an electronic hardware unit that presents the navigation information in a visual form. The display interface 202 can include a display device, a projector, a video screen, or a combination thereof.

The display interface 202 can present a navigation map with a navigation route 204, which is defined as a path for travel from an origin to a destination. The display interface 202 can present a point of interest 206 along the navigation route 204. The point of interest 206 is associated with a geographical location along the navigation route 204.

The display interface 202 can present a notification 208, which is defined as a message that is associated with the point of interest 206. The notification 208 can be presented for a search of a search keyword 210 associated with the point of interest 206 for navigation purposes. The search keyword 210 is defined as a word or a group of words used in a search for navigation information associated with the point of interest 206.

The notification 208 can include a message indicating that the point of interest 206 is closed since the point of interest 206 has been identified as invalid. For example, the notification 208 is shown as "ALERT: BREAD BAKERY IS CLOSED" to indicate that "Bread Bakery" as the point of interest 206 is closed.

The notification 208 is shown in a textual representation, although it is understood that the notification 208 can be presented with any visual, audible, or mechanical methods. For example, the notification 208 can be presented with text, images, audio, video, graphics, vibration, or a combination thereof.

Figure 3:
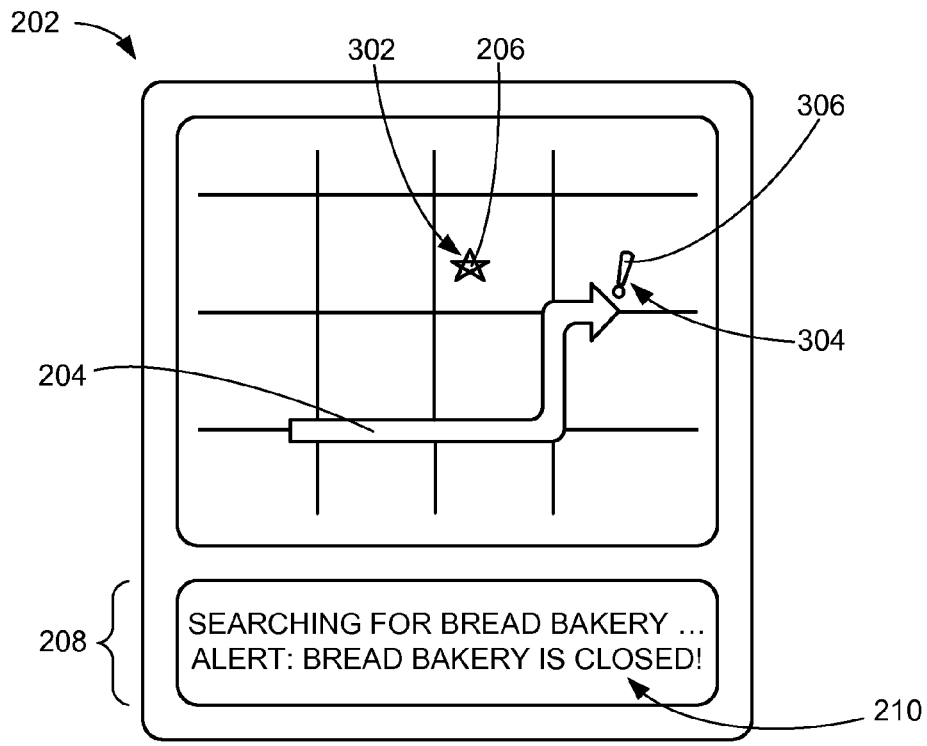
FIG. 3 is a second example of the display on the display interface of the first device of FIG. 1.

Referring now to FIG. 3, therein is shown a second example of the display on the display interface 202 of the first device 102 of FIG. 1. The display interface 202 can present a navigation map with the navigation route 204. The display interface 202 can present the point of interest 206 along the navigation route 204.

The display interface 202 can present the navigation route 204 continues from a first location 302 of the point of interest 206 to a second location 304 of a second point of interest 306. The first location 302 and the second location 304 are defined as geographical locations. The second point of interest 306 is associated with a geographical location nearby the point of interest 206.

The display interface 202 can present the notification 208. The notification 208 can be presented for a search of the search keyword 210 associated with the point of interest 206 for navigation purposes.

The notification 208 can include a message indicating that the point of interest 206 is closed or invalid. For example, the notification 208 is shown as "ALERT: BREAD BAKERY IS CLOSED" to indicate that "Bread Bakery" as the point of interest 206 is closed.

Figure 4:
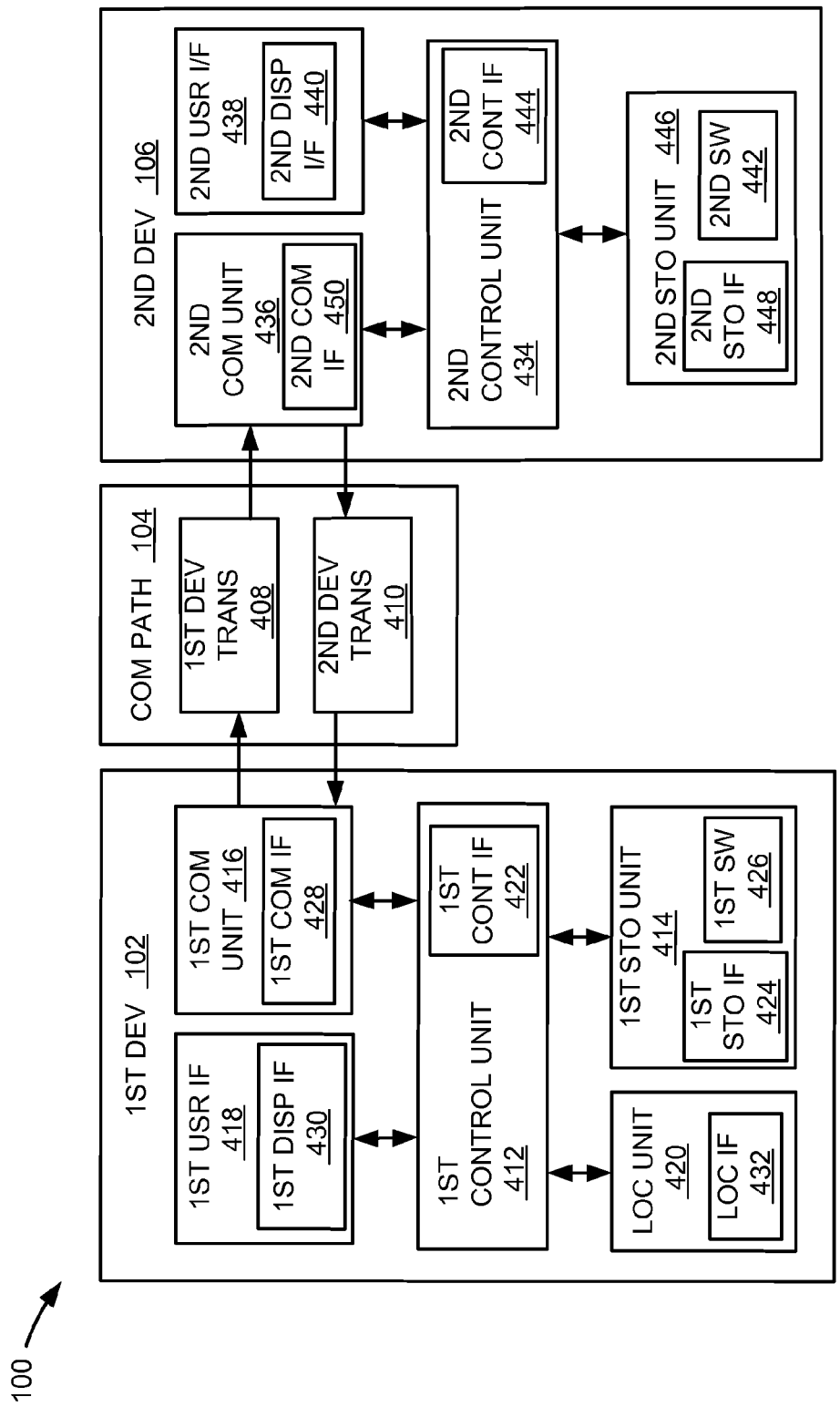
FIG. 4 is an exemplary block diagram of the navigation system.

Referring now to FIG. 4, therein is shown an exemplary block diagram of the navigation system 100. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first control unit 412 can include a first control interface 422. The first control unit 412 can execute a first software 426 to provide the intelligence of the navigation system 100.

The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof.

The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations external to the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations external to the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as nonvolatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations external to the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, or any combination thereof to provide data and communication inputs.

The first user interface 418 can include a first display interface 430. The first display interface 430 can include a display, a projector, a video screen, a speaker, or any combination thereof. The first display interface 430 can be represented by the display interface 202 of FIG. 2.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations external to the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as nonvolatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations external to the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. In addition, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figure 5:
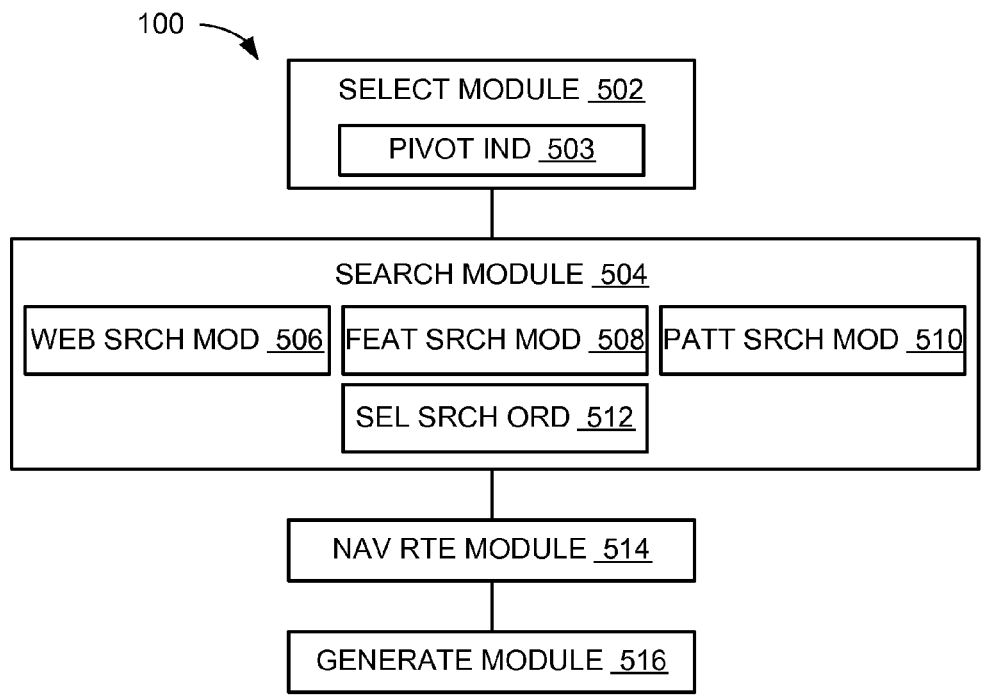
FIG. 5 is a control flow of the navigation system.

Referring now to FIG. 5, therein is shown a control flow of the navigation system 100. The navigation system 100 can include an operation to detect and curate invalid points of interest from contents. Curation refers to an operation of collecting information associated with the point of interest 206 of FIG. 2 including if an address is valid, if a POI has moved, and if a POI has been closed or out of business.

One of the difficult tasks in maintaining a database of the point of interest 206 is to make sure data in the database is current. The data or a record of the point of interest 206 becomes invalid whenever a business or an entity associated with the point of interest 206 moves from one location to other location, if a store associated with the point of interest 206 is out of business and closes down, the point of interest 206 is closed for the day or for a holiday, or in a case where a digit is mistakenly dropped from a street address of the point of interest 206.

Detection of the point of interest 206 as invalid and marking the point of interest 206 as closed or deletion of the point of interest 206 from the database can be done intelligently by mining information from different sources. The navigation system 100 includes new operations that facilitate determination of the point of interest 206 as closed or invalid.

The navigation system 100 can include a select module 502. The select module 502 can be used to select the search keyword 210 of FIG. 2. The search keyword 210 can be selected with a word or a group of words so that the point of interest 206 can be subsequently determined as closed or invalid. The search keyword 210 can be preset to a word or a group of words in the select module 502 prior to the select module 502 is in operation.

The search keyword 210 can be associated with the point of interest 206. When a user drives to the first location 302 of FIG. 3 of the point of interest 206 and the point of interest 206 is closed down, the search keyword 210 can be selected automatically without another user intervention for the user to search for the second point of interest 306 of FIG. 3. For example, the second point of interest 306 can be the same or similar business as the point of interest 206.

The search keyword 210 can include a pivot indicator 503, which is defined as a word, a group of words, or a symbol that is selected for search of information for determination of whether the point of interest 206 is closed or invalid. The pivot indicator 503 can represent text, symbol, or a combination thereof.

The select module 502 can select the search keyword 210 having the pivot indicator 503 as a key term that frequently appears in reviews of the closed POIs. The select module 502 can select the search keyword 210 having the pivot indicator 503 as a symbol that represents information associated with the point of interest 206. The symbol can represent a pictorial sign, a silhouette, or an icon. The symbol can be used to verify that the point of interest 206 is closed or invalid.

The navigation system 100 can include a search module 504. The search module 504 performs a search for relevant information associated with the point of interest 206. The search module 504 marks the point of interest 206 as closed or invalid based on the results of the search with the search keyword 210 selected. The search module 504 verifies if the brand names and addresses of the point of interest 206 are valid or invalid.

The search module 504 can include a web search module 506, a feature search module 508, and a pattern search module 510. The web search module 506 performs a search for relevant information associated with the point of interest 206 by browsing a website or the World Wide Web using a search engine. The feature search module 508 extracts navigation information from a database of the point of interest 206 supplied by point of interest providers. The pattern search module 510 extracts navigation information including arrival times at destinations from navigation logs and determines if the point of interest 206 is closed.

The search module 504 can verify if the point of interest 206 is valid or invalid based on the relevant information and the navigation information generated by the web search module 506, the feature search module 508, and the pattern search module 510. For example, if more than one of the web search module 506, the feature search module 508, and the pattern search module 510 indicated that the point of interest 206 are valid or invalid, then the search module 504 can determine that the point of interest 206 are valid or invalid, respectively.

The search module 504 can verify if the point of interest 206 is valid or invalid based on a search selection order 512 if there is a discrepancy among the relevant information and the navigation information generated by the web search module 506, the feature search module 508, and the pattern search module 510.

The search selection order 512 is defined as a sequence by which the search module 504 follows to select the relevant information and the navigation information. For example, if the web search module 506 indicates that the point of interest 206 are valid and the feature search module 508 indicates that the point of interest 206 are invalid, then the search module 504 can select the relevant information from the web search module 506 and determine that the point of interest 206 are valid if the search selection order 512 identifies that the relevant information from the web search module 506 has a higher priority over the navigation information from the feature search module 508.

The search selection order 512 can be preset. The term preset means that the search selection order 512 is configured to a known sequence among the web search module 506, the feature search module 508, and the pattern search module 510 before the search module 504 is in operation. The web search module 506, the feature search module 508, and the pattern search module 510 will be described in more details in subsequent sections.

The navigation system 100 can include a navigation route module 514. The navigation route module 514 generates the navigation route 204 of FIG. 2 or the navigation route 204 of FIG. 3. The navigation route module 514 can generate the navigation route 204 to the point of interest 206 as shown in FIG. 2 when the point of interest 206 is verified as valid by the search module 504. The navigation route module 514 can generate the navigation route 204 to the second point of interest 306 as shown in FIG. 3 when the point of interest 206 is verified as invalid by the search module 504.

The navigation route module 514 can generate the navigation route 204 to the point of interest 206 when the point of interest 206 is open for business. When the point of interest 206 is closed for the day or for a holiday and a current location of the first device 102 of FIG. 1 or the second device 106 of FIG. 1 is not at or within a preset distance from the first location 302, the navigation route module 514 can recalculate the navigation route 204 to the second location 304 of FIG. 3. The preset distance is a numerical value of a distance that is determined prior to the navigation route module 514 is in operation.

The navigation system 100 can include a generate module 516. The generate module 516 generates the notification 208 of FIG. 2 with the point of interest 206 marked as closed by the search module 504 for displaying on a device, including the first device 102.

The select module 502 can be coupled to the web search module 506, the feature search module 508, and the pattern search module 510. The web search module 506, the feature search module 508, and the pattern search module 510 can be coupled to the generate module 516.

The select module 502 can be implemented with the first control unit 412 of FIG. 4, the first storage unit 414 of FIG. 4, the first communication unit 416 of FIG. 4, the first user interface 418 of FIG. 4, the second control unit 434 of FIG. 4, the second communication unit 436 of FIG. 4, the second user interface 438 of FIG. 4, the second storage unit 446 of FIG. 4, or a combination thereof. For example, the first user interface 418 can be implemented to select the search keyword 210 or the pivot indicator 503.

The search module 504 can be implemented with the first control unit 412, the first storage unit 414, the first communication unit 416, the first user interface 418, the second control unit 434, the second communication unit 436, the second user interface 438, the second storage unit 446, or a combination thereof. For example, the first control unit 412 can be implemented to mark the point of interest 206 as closed or invalid.

The generate module 516 can be implemented with the first control unit 412, the first storage unit 414, the first communication unit 416, the first user interface 418, the second control unit 434, the second communication unit 436, the second user interface 438, the second storage unit 446, or a combination thereof. For example, the first user interface 418 can be implemented to generate the notification 208 with the point of interest 206 marked as closed for displaying on the first device 102.

It has been discovered that the search module 504 provides improved quality by verifying if the point of interest 206 is valid or invalid with multiple methods implemented in the web search module 506, the feature search module 508, and the pattern search module 510.

It has also been discovered that the select module 502 further provides improved quality by selecting the search keyword 210 with the pivot indicator 503 for an effective search so that subsequent processing is able to identify whether the point of interest 206 is closed.

It has further been discovered that the generate module 516 further provides improved quality by presenting the notification 208 on the device so that users of the navigation system 100 do not have to unnecessarily drive to locations that no longer exist or closed since the point of interest 206 has been identified as invalid.

Figure 6:
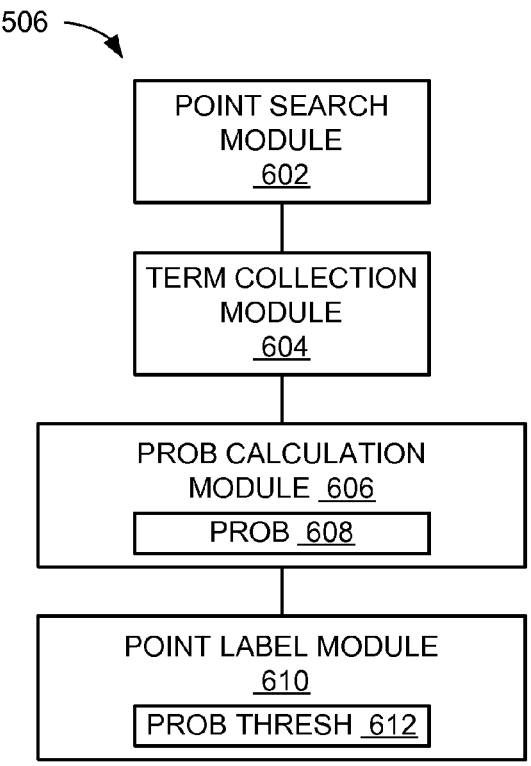
FIG. 6 is a detailed control flow of the web search module.

Referring now to FIG. 6, therein is shown a detailed control flow of the web search module 506. The web search module 506 can include a point search module 602 for performing a search for relevant information associated with the point of interest 206 of FIG. 2. The point search module 602 can perform the search for the point of interest 206 by browsing the World Wide Web.

If a uniform resource locator (URL) is present in or provided by the database of the point of interest 206, the point search module 602 can crawl or examine information on a website associated with the point of interest 206. The uniform resource locator is a specific character string or an identifier that refers to an internet resource. The uniform resource locator identifies the website associated with the point of interest 206. The point search module 602 can examine the information on the website to detect the search keyword 210 of FIG. 2, such as a word or a group of words including "closed", "permanently closed", or any word with the same or similar meaning thereof.

If the uniform resource locator is not available in the database for the point of interest 206 or the database is provided without website information associated with the point of interest 206, the point search module 602 can perform a search on the world wide web using a search engine including Google or Bing. Without the website information, the point search module 602 can examine search results from the search to detect the search keyword 210.

The web search module 506 can include a term collection module 604. The term collection module 604 receives search information from the point search module 602. The search information includes the search results including phrases or groups of words including the search keyword 210 and terms near the search keyword 210. The term collection module 604 stores the search information.

The web search module 506 can include a probability calculation module 606. The probability calculation module 606 estimates a probability 608 of the point of interest 206 being closed. The probability 608 is defined as a measure of how likely something is to happen. The probability calculation module 606 can estimate the probability 608 using statistics methods including Bayesian classifier or any statistical method including collection, organization, analysis, and interpretation of data.

The web search module 506 can include a point label module 610. The point label module 610 marks the point of interest 206 as closed with the search keyword 210 selected. The point label module 610 marks or labels the point of interest 206 as closed based on the probability 608. The point label module 610 can make a decision of whether the point of interest 206 is closed or invalid. The point label module 610 can categorize or mark the point of interest 206 as closed based on the search results and the probability calculation as described above.

The point label module 610 can mark the probability 608 as closed if the probability 608 is greater than a probability threshold 612. The probability threshold 612 is defined as a preset numerical value, above which the probability 608 indicates that the point of interest 206 is likely closed.

The probability threshold 612 is preset with a fixed numerical value configured prior to the point label module 610 is in operation. The probability threshold 612 can be preset to any numerical value. For example, the probability threshold 612 can be preset to 0.9.

For example, following is a pseudo-code for implementing the web search module 506.

```
function closedPOIsDetection( )
Inputs: POI record
    Search the web for the brand name and address and collect the results
    Collect the terms in the vicinity of the word "closed" as independent
        features.
    Use a Bayesian classifier to estimate the probability of the POI being
        closed
    Mark the POI as closed if the probability is greater than 0.9.
end function
```

The web search module 506 includes a function "closedPOIsDetection( )", which reads a point of interest (POI) record input from the database of the point of interest 206. The web search module 506 can include the point search module 602 to search the web for a brand name or an address of the point of interest 206.

The web search module 506 can include the term collection module 604 to collect the search results and the terms in the vicinity of the search keyword 210, including a word "closed". The search results and the terms are independent features that are subsequently used in a probability model by the probability calculation module 606.

The web search module 506 can include the probability calculation module 606 to estimate the probability 608 of the point of interest 206 being closed using a Bayesian classifier. The web search module 506 can include the point label module 610 to mark the point of interest 206 as closed if the probability 608 is greater than the probability threshold 612 of 0.9.

The point search module 602 can be coupled to the term collection module 604. The term collection module 604 can be coupled to the probability calculation module 606. The probability calculation module 606 can be coupled to the point label module 610.

The point search module 602 can be implemented with the first control unit 412 of FIG. 4, the first storage unit 414 of FIG. 4, the first communication unit 416 of FIG. 4, the first user interface 418 of FIG. 4, the second control unit 434 of FIG. 4, the second communication unit 436 of FIG. 4, the second user interface 438 of FIG. 4, the second storage unit 446 of FIG. 4, or a combination thereof. For example, the first control unit 412 can be implemented to perform the search for the point of interest 206 by browsing the World Wide Web.

The term collection module 604 can be implemented with the first control unit 412, the first storage unit 414, the first communication unit 416, the second control unit 434, the second communication unit 436, the second storage unit 446, or a combination thereof. For example, the first storage unit 414 can be implemented to store the search information.

The probability calculation module 606 can be implemented with the first control unit 412, the first storage unit 414, the first communication unit 416, the second control unit 434, the second communication unit 436, the second storage unit 446, or a combination thereof. For example, the first control unit 412 can be implemented to calculate or estimate the probability 608 of the point of interest 206 being closed.

The point label module 610 can be implemented with the first control unit 412, the first storage unit 414, the first communication unit 416, the second control unit 434, the second communication unit 436, the second storage unit 446, or a combination thereof. For example, the first control unit 412 can be implemented to mark or label the point of interest 206 as closed based on the probability 608.

It has been discovered that the point search module 602 improves overall effectiveness of search methods with more data availability by browsing the World Wide Web or websites associated with the point of interest 206.

It has also been discovered that the term collection module 604 further improves overall effectiveness of search methods by storing the search information including the search keyword 210 and the terms near the search keyword 210 so that the search information are readily available for subsequent processing.

It has further been discovered that the probability 608 estimated by the probability calculation module 606 provides improved quality by predicting how likely the point of interest 206 is closed using statistics methods including Bayesian classifier or any statistical method including collection, organization, analysis, and interpretation of data.

It has yet further been discovered that the point label module 610 provides improved prediction that the point of interest 206 is likely closed if the probability 608 is greater than the probability threshold 612.

Figure 7:
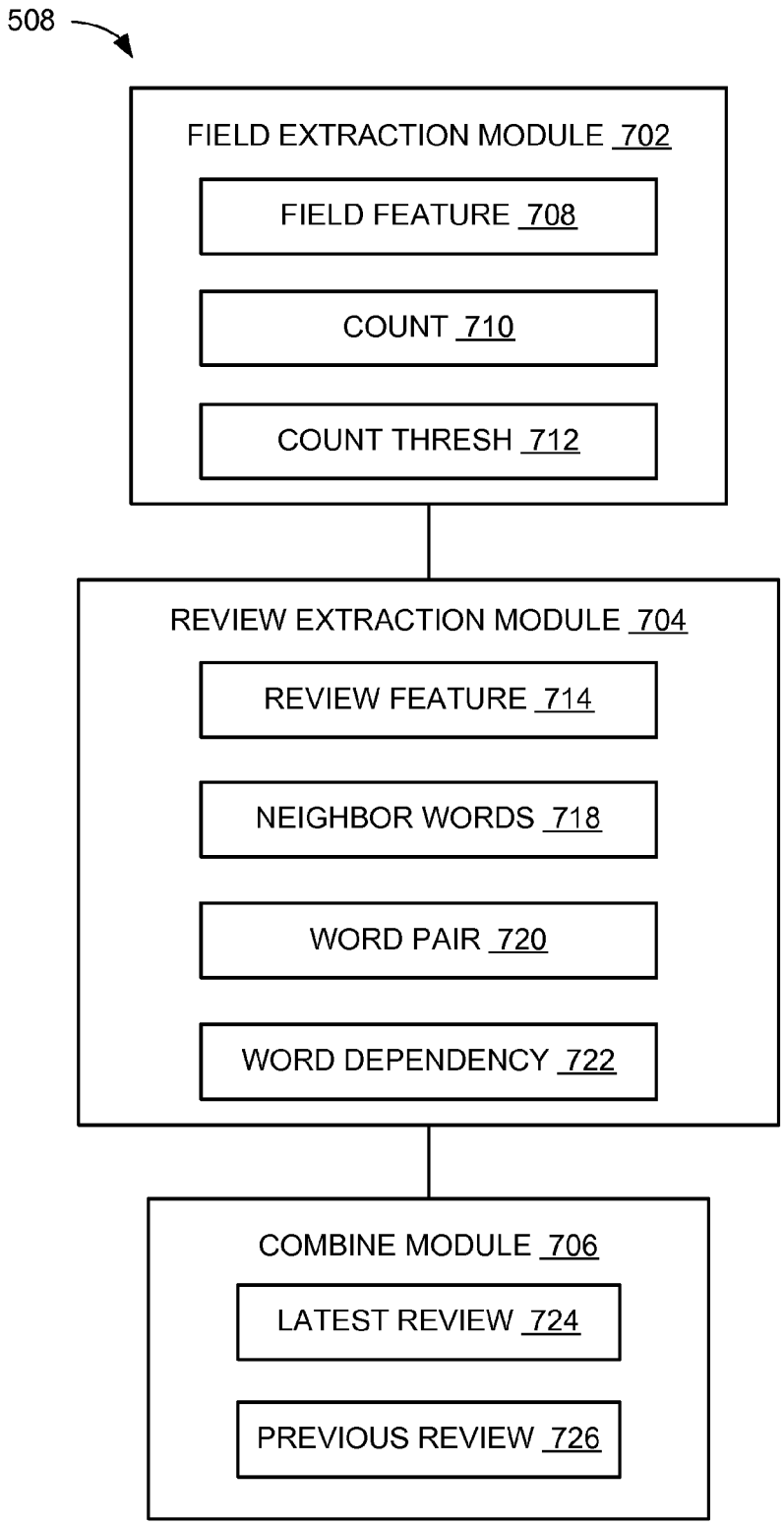
FIG. 7 is a detailed control flow of the feature search module.

Referring now to FIG. 7, therein is shown a detailed control flow of the feature search module 508. The feature search module 508 can include a field extraction module 702, a review extraction module 704, and a combine module 706.

The field extraction module 702 extracts a field feature 708 from information in the database of the point of interest 206 of FIG. 2. The field feature 708 is defined as relevant information extracted from the information in the database of the point of interest 206 into a reduced set of data for further processing. For example, the information can include point of interest (POI) records, which can be provided by a POI vendor or a navigation data provider.

The information associated with the point of interest 206 can be embedded or included in a field extracted from the field feature 708. A tag in the field can include a word or a group of words that match the search keyword 210 of FIG. 2. The tag provides a description of the point of interest 206. For example, the tag "closed" can be attached to a brand name of the point of interest 206. The information can be associated with the point of interest 206. The information provided from different vendor sources or navigation data providers can be grouped together.

A POI record can include a number of fields including brand name, street address, city, state, zip code, Standard Industrial Classification (SIC) description, creation date, customer reviews, and review date. The fields can include information indicating validity of the point of interest 206. A number of patterns can be identified in the fields that can be used to conclusively signal or determine that the point of interest 206 has gone out of business or moved.

The tag refers to a pattern within the fields. The tag can include information associated with validity of the point of interest 206. For example, if the point of interest 206 is a business ABC at a location XYZ that has gone out of business, a brand name field for the point of interest 206 can include "ABC-CLOSED". In this example, a pattern is identified by a brand name ending with "-CLOSED". As such, the pattern can be referred to as a tag.

The field extraction module 702 can calculate a count 710 by adding a number of the vendor sources that indicate the point of interest 206 is closed based on the tag in the field. If the count 710 is greater than a count threshold 712, the field extraction module 702 can mark the point of interest 206 as possibly closed with the search keyword 210 selected.

The count threshold 712 is defined as a preset value, above which the count 710 indicates that the point of interest 206 is likely closed. The count threshold 712 is preset with a fixed value configured prior to the field extraction module 702 is in operation. The count threshold 712 can be preset to any value. For example, the count threshold 712 can be preset to 1.

The review extraction module 704 extracts a review feature 714 from point of interest (POI) reviews. The review extraction module 704 performs sentiment analysis by training a classifier to determine closed point of interests (POIs). Different types of the review feature 714 can be useful to distinguish open POIs and closed POIs. The review feature 714 can include neighbor features or dependency features.

The neighbor features are defined as information extracted from the POI reviews that include the search keyword 210, including the pivot indicator 503 of FIG. 5, and neighbor words 718. The neighbor words 718 are defined as terms or words that appear next to the search keyword 210.

The review extraction module 704 can extract the neighbor words 718 adjacent the search keyword 210. The review extraction module 704 can recognize the search keyword 210 and the neighbor words 718 that are before, after, or a combination thereof, the search keyword 210. A combination of the search keyword 210 and the neighbor words 718 can form n-gram word features, which are sequences of "n" number of words.

In a first example, a term "closed" can frequently appear in closed POI reviews including "this place has closed down" and thus can be qualified as the search keyword 210. In a second example, the term can appear in open POI reviews including "this place is closed on Sundays". Differences between the first example and the second example are the neighbor words 718 that are before and after the search keyword 210 "closed".

Combinations of the search keyword 210 and the neighbor words 718 can be extracted as features and can be assigned with weight values according to a frequency of occurrence in POI reviews. The weight values are defined as numerical values that indicate how frequently each of the combinations occurs.

For example, one of the combinations that most frequently occurs in the POI reviews can be assigned with a highest weight value compared to those of other combinations. For another example, another of the combinations that least frequently appears in the POI reviews can be assigned with a lowest weight value compared to those of other combinations.

The dependency features are defined as information extracted from the POI reviews that include a word pair 720 and a word dependency 722. The word pair 720 is defined as a combination of two terms or words. The word dependency 722 is defined as a relationship between words in the word pair 720.

A syntactic structure of a sentence can be described in terms of words and binary semantic or syntactic relations between these words. The word pair 720 including a pair of dependent words represents a feature. The word dependency 722 including a type of dependency between the dependent words represents a feature value of the feature. This is fundamentally different from a syntactic representation of sentences. Constituents and phrase-structure rules do not play any role in dependency grammars.

The word pair 720 and the word dependency 722 can be determined by an extraction operation including dependency features extraction. The extraction operation can be used to classify the point of interest 206 as closed or open based on a POI review.

The word dependency 722 can include any types of dependencies, including nominal subject, clausal subject, direct object, indirect object, object of preposition, and temporal modifier. The word dependency 722 can be extracted out from the POI reviews to create a set of the dependency features.

As an example, for the first example with "this place has closed down" and the second example with "this place is closed on Sundays", the followings are the dependency features and a value for each of the dependency features.

Dependency features for the first example:
Feature: (place, this); Value: det
Feature: (closed, place); Value: nsubj
Feature: (closed, has); Value: aux
Feature: (closed, down); Value: prt
Dependency features for the second example:
Feature: (place, this); Value: det
Feature: (closed, place); Value: nsubjpass
Feature: (closed, is); Value: auxpass
Feature: (closed, Sundays); Value: prep_on In this example, grammatical relations including "det", "nsubj", "aux", "prt", "nsubjpass", "auxpass", and "prep_on" refer to determiner, nominal subject, auxiliary, phrasal verb particle, passive nominal subject, passive auxiliary, and prepositional modifier "on", respectively. The grammatical relations can be used to determine dependencies between words.

A dependency feature of "(place, this)" in the first example and the second example has the same value. However, a value of a dependency feature of "(closed, place)" in the first example is different from a value of the same dependency feature in the second example. Other dependency features uniquely occur in the first example and the second example.

These dependency features represent strong discrimination between the open POI reviews and the closed POI reviews for sentiment analysis, which refers to an application including natural language processing, computational linguistics, text analytics, or a combination thereof to identify and extract subjective information in source materials. Strong discrimination means that the dependency features are used to clearly identify whether the point of interest 206 is closed or invalid as each of the dependency features is extracted from either the open POI reviews or the closed POI reviews.

POI reviews that have multiple sentences can be processed with a high dimension feature space. For example, for POI reviews with two to three sentences, a statistical classification method or regression analysis can be used. As an example, a statistical classification method, including Support Vector Machine (SVM) or a supervised learning method that analyzes data and recognizes patterns, can be implemented as a classifier to partition a feature space for the POI open reviews and the POI closed reviews.

A Support Vector Machine can represent a type of statistical learning machine that receives a set of input data points labeled with one of two possible classes (or categories) and builds a model that predicts a category for any given input. The Support Vector Machine can be designed to build models that separate inputs of different categories by a margin as wide as possible.

The combine module 706 marks the point of interest 206 as closed based on results from a vendor POI record search in the field extraction module 702 and a review feature extraction from the review extraction module 704. The point of interest 206 can be marked as closed based on a latest review 724 and a previous review 726. The point of interest 206 can be marked as closed if the latest review 724 extracted by the review extraction module 704 indicates that the point of interest 206 is closed and the vendor POI record search performed by the field extraction module 702 indicates that the point of interest 206 is possibly closed.

The latest review 724 is defined as most recent information associated with comments, analysis, or assessment for the point of interest 206. The term "most recent" means that the latest review 724 is available in time later than other reviews for the point of interest 206.

The point of interest 206 can be marked as closed if the latest review 724 extracted by the review extraction module 704 indicates that the point of interest 206 is closed and the previous review 726 extracted by the review extraction module 704 also indicates that the point of interest 206 is closed. The previous review 726 is a review other than the latest review 724 and is information associated with comments, analysis, or assessment for the point of interest 206.

The field extraction module 702 can be coupled to the review extraction module 704. The review extraction module 704 can be coupled to the combine module 706.

The field extraction module 702 can be implemented with the first control unit 412 of FIG. 4, the first storage unit 414 of FIG. 4, the first communication unit 416 of FIG. 4, the first user interface 418 of FIG. 4, the second control unit 434 of FIG. 4, the second communication unit 436 of FIG. 4, the second user interface 438 of FIG. 4, the second storage unit 446 of FIG. 4, or a combination thereof. For example, the first control unit 412 can be implemented to generate the count 710.

The review extraction module 704 can be implemented with the first control unit 412, the first storage unit 414, the first communication unit 416, the first user interface 418, the second control unit 434, the second communication unit 436, the second user interface 438, the second storage unit 446, or a combination thereof. For example, the first control unit 412 can be implemented to extract the neighbor words 718 adjacent the search keyword 210.

The combine module 706 can be implemented with the first control unit 412, the first storage unit 414, the first communication unit 416, the first user interface 418, the second control unit 434, the second communication unit 436, the second user interface 438, the second storage unit 446, or a combination thereof. For example, the first control unit 412 can be implemented to mark the point of interest 206 as closed based on results from the vendor POI record search in the field extraction module 702 and the review feature extraction from the review extraction module 704.

It has been discovered that the field extraction module 702 providing the field feature 708 improves overall effectiveness of search methods with more data availability by providing the tag in the field of the field feature 708.

It has also been discovered that the count 710 calculated by the field extraction module 702 provides improved quality by predicting how likely the point of interest 206 is closed if the count 710 is greater than the count threshold 712.

It has further been discovered that the review extraction module 704 providing the review feature 714 also improves overall effectiveness of search methods with more data availability by providing the neighbor features with the search keyword 210, including the pivot indicator 503, and the neighbor words 718.

It has further been discovered that the dependency features including the word pair 720 and the word dependency 722 provides improved prediction since the word pair 720 and the word dependency 722 are used to clearly identify whether the point of interest 206 is closed or invalid as each of the dependency features is extracted from either the open POI reviews or the closed POI reviews.

It has further been discovered that the combine module 706 also provides improved prediction by marking the point of interest 206 as closed if the latest review 724 extracted by the review extraction module 704 indicates that the point of interest 206 is closed and either the vendor POI record search performed by the field extraction module 702 or the previous review 726 extracted by the review extraction module 704 also indicates that the point of interest 206 is closed.

Figure 8:
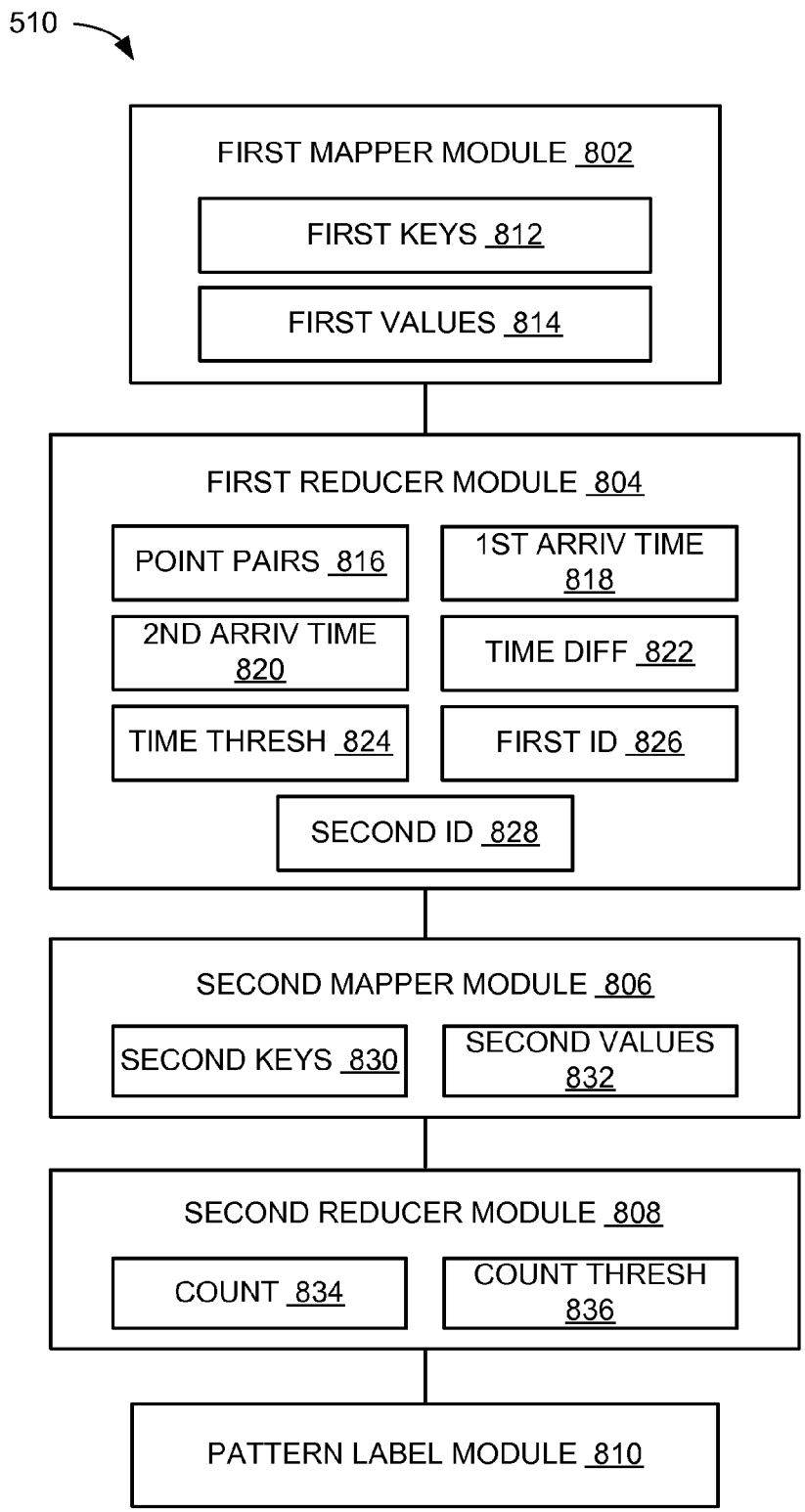
FIG. 8 is a detailed control flow of the pattern search module.

Referring now to FIG. 8, therein is shown a detailed control flow of the pattern search module 510. The pattern search module 510 extracts navigation information including arrival times at destinations and determines if the point of interest 206 of FIG. 2 is closed. The pattern search module 510 can include a first mapper module 802, a first reducer module 804, a second mapper module 806, a second reducer module 808, and a pattern label module 810. For example, the navigation information can be extracted from navigation logs.

The pattern search module 510 can extract a pattern of driving behavior when a user drives from one destination to another destination. The search keyword 210 of FIG. 2 can be associated with a waypoint. When a user drives to the first location 302 of FIG. 3 of the point of interest 206 and the point of interest 206 is closed down, the search keyword 210 can be selected for the user to search for the second point of interest 306 of FIG. 3. For example, the second point of interest 306 can be the same or similar business as the point of interest 206.

The user can drive to the second location 304 of FIG. 3 of the second point of interest 306. The second location 304 can be nearby the first location 302. Repeated occurrence of this pattern can indicate that the point of interest 206 at the first location 302 is closed down.

The following section describes a problem formulation for detecting closed point of interests (POIs). Given the navigation logs including all the destinations driven to, destination pairs can be identified to which users have driven in a short interval of time. Then, the destination pairs can be passed through a filter that eliminates pairs with different brand names. If more than two users show up or included in a filtered set, then a status of the point of interest 206 can be marked as possibly closed.

The first mapper module 802 reads the navigation logs and extracts navigation arrival times. The first mapper module 802 searches the navigation logs for arrival times at a destination that has been visited by each of the users. The first mapper module 802 can generate first keys 812 and first values 814 for the first keys 812. The first keys 812 are defined as dates when each of the user travels to destinations of points of interests. The first values 814 are defined as arrival times when each of the users arrives at one of the destinations of each of the points of interest. The first mapper module 802 can emit the first keys 812 and the first values 814 to the first reducer module 804.

The first reducer module 804 collects all of the first values 814 for each of the first keys 812. The first reducer module 804 generates and saves point pairs 816, which are defined as pairs of the point of interest 206 and the second point of interest 306. For example, the point pairs 816 can represent ordered pairs.

The ordered pairs can include grouping of the point of interest 206 and the second point of interest 306. The ordered pairs can be used to represent pairs of POIs, such as POI1 and POI2, visited by a user within a short interval of time. Since the user has driven to POI1 before driving to POI2, an order by which the ordered pairs are saved is important. By applying a constraint that brand names of POI1 and POI2 are the same and at least two different users have recorded POI1 as closed, it can be concluded that POI1 is closed with high probability.

The point pairs 816 can be generated based on a first arrival time 818, a second arrival time 820, the point of interest 206, and the second point of interest 306. The first arrival time 818 and the second arrival time 820 are defined as times of a day recorded when a user or a vehicle arrives at the point of interest 206 and the second point of interest 306, respectively.

The first reducer module 804 can calculate a time difference 822, which is defined as time duration between recorded arrival times of a day. The time difference 822 can be calculated by taking a difference between the first arrival time 818 and the second arrival time 820.

The point pairs 816 can be generated when the time difference 822 is less than a time threshold 824 with the first arrival time 818 greater than the second arrival time 820 and a first identifier 826 of the point of interest 206 is the same as or similar to a second identifier 828 of the second point of interest 306.

The first identifier 826 and the second identifier 828 are defined as names, identification, or types of the point of interest 206 and the second point of interest 306, respectively. For example, the first identifier 826 and the second identifier 828 can represent brand names. Also for example, the first identifier 826 and the second identifier 828 can represent types of points of interest including auto repair, camping, festivals, hospitals, outdoor, parks, sports, WiFi hot spots, wineries, or any other point of interest categories.

The time threshold 824 is defined as a preset numerical value of duration of time, below which the second point of interest 306 is determined to be nearby the point of interest 206. The time threshold 824 is preset with a fixed numerical value configured prior to the first reducer module 804 is in operation. The time threshold 824 can be preset to any numerical value. For example, the time threshold 824 can be preset to 0.9.

The second mapper module 806 receives the point pairs 816 and extracts navigation points of interest. The second mapper module 806 reads the point pairs 816. The second mapper module 806 can generate second keys 830 and second values 832 for the second keys 830. The second keys 830 and the second values 832 are defined as points of interests. The second keys 830 and the second values 832 can include the point of interest 206 and the second point of interest 306, respectively. The second mapper module 806 can emit the second keys 830 and the second values 832 to the second reducer module 808.

Each of the second keys 830 can be associated with a number of the second values 832. The second reducer module 808 can generate a count 834 for each of the second keys 830. The count 834 is defined as a numerical value of a number of the second values 832 of one of the second keys 830. The second reducer module 808 can generate the count 834 by counting a number of the second values 832 of one of the second keys 830 and save the one of the second keys 830 if the count 834 is greater than a count threshold 836.

The count threshold 836 is defined as a preset numerical value, above which the point of interest 206 can be marked as closed. The count threshold 836 is preset with a fixed numerical value configured prior to the second reducer module 808 is in operation. The count threshold 836 can be preset to any numerical value. For example, the count threshold 836 can be preset to 2.

The one of the second keys 830 can include the point of interest 206. After the one of the second keys 830 is saved by the second reducer module 808, the pattern label module 810 can mark the point of interest 206 as possibly closed.

Let the navigation logs include (User, POI, Time stamp) triplets. The following pseudo-code can be implemented to detect the point of interest 206 as possibly closed.

```
For each User, U
    For each Day, D
        Trips(U,D) = {∪(POI, Time)}
        PoiPairs(U) = PoiPairs(U) + {(POI1, POI2) ⊂ Trips(U,D) such
            that [Time1 − Time2 < Threshold1 and Time1 > Time2]
            and [POI1 brand name = POI2 brand name]}
    End
End
For each x ⊂ {POI1 in PoiPairs}
    count <− No. of pairs containing x as POI1
    if count > Threshold2
        mark POI1 as possibly closed
    end if
End
```

The first mapper module 802 can read the navigation logs. For trips that a user (U) travels on each day (D), the first mapper module 802 can extract all arrival times (Time) recorded for each point of interest (POI). The first mapper module 802 can generate and emit the first keys 812 and the first values 814 to the first reducer module 804. In the pseudo-code, the symbol "∪" means a union of.

The first reducer module 804 can generate the point pairs 816 for the trips based on the first keys 812 and the first values 814. The point pairs 816 can be generated when the time difference 822 is less than the time threshold 824 with the first arrival time 818 greater than the second arrival time 820 and the first identifier 826 of the point of interest 206 is the same as or similar to the second identifier 828 of the second point of interest 306. In the pseudo-code, the symbol "⊂" means an element of.

The second mapper module 806 receives the point pairs 816 and generates the second keys 830 and the second values 832 for the second reducer module 808 to process. For each member of a set of the point pairs 816, the second reducer module 808 can generate the count 834 by counting a number of the point of interest 206 (POI1) found in the point pairs 816. If the count 834 is greater than the count threshold 836, the pattern label module 810 can mark the point of interest 206 as possibly closed.

Since the navigation logs can be a very large corpus, the following distributed computing implementation is proposed in an exemplary pseudo-code. The idea is to store the navigation logs on multiple servers and compute statistics of data on multiple machines simultaneously. For example, the proposed distributed computing implementation can represent a Map-Reduce version of the algorithm described above to detect possibly closed points of interest (POIs).

Mapper1: Reads (User, POI, Time) and emits (User, Date) as key and (POI, Time) as value.

Reducer1: For each key (User, Date), collect all (POI, Time). Save ordered (POI1, POI2) pairs which satisfy (Time1−Time2<Threshold1 and Time1>Time2) and (POI1 brand name=POI2 brand name).

Mapper2: Reads (POI1, POI2) pairs and emits POI1 as key and POI2 as value.

Reducer2: For POI1, count the number of values and save POI1 if the count>Threshold2.

For example, Threshold1=30 minutes and Threshold2=2.

The first mapper module 802 can be coupled to the first reducer module 804. The first reducer module 804 can be coupled to the second mapper module 806. The second mapper module 806 can be coupled to the second reducer module 808. The second reducer module 808 can be coupled to the pattern label module 810.

The first mapper module 802 can be implemented with the first control unit 412 of FIG. 4, the first storage unit 414 of FIG. 4, the first communication unit 416 of FIG. 4, the first user interface 418 of FIG. 4, the second control unit 434 of FIG. 4, the second communication unit 436 of FIG. 4, the second user interface 438 of FIG. 4, the second storage unit 446 of FIG. 4, or a combination thereof. For example, the first control unit 412 can be implemented to generate the first keys 812 and the first values 814 for the first keys 812.

The first reducer module 804 can be implemented with the first control unit 412, the first storage unit 414, the first communication unit 416, the first user interface 418, the second control unit 434, the second communication unit 436, the second user interface 438, the second storage unit 446, or a combination thereof. For example, the first control unit 412 and the first storage unit 414 can be implemented to generate and save the point pairs 816, respectively. Also for example, the first control unit 412 can be implemented to calculating the time difference 822 between the first arrival time 818 recorded at the point of interest 206 and the second arrival time 820 recorded at the second point of interest 306.

The second mapper module 806 can be implemented with the first control unit 412, the first storage unit 414, the first communication unit 416, the first user interface 418, the second control unit 434, the second communication unit 436, the second user interface 438, the second storage unit 446, or a combination thereof. For example, the first control unit 412 can be implemented to generate the second keys 830 and the second values 832 for the second keys 830.

The second reducer module 808 can be implemented with the first control unit 412, the first storage unit 414, the first communication unit 416, the first user interface 418, the second control unit 434, the second communication unit 436, the second user interface 438, the second storage unit 446, or a combination thereof. For example, the first control unit 412 and the first storage unit 414 can be implemented to generate the count 834 and save the one of the second keys 830, respectively.

The pattern label module 810 can be implemented with the first control unit 412, the first storage unit 414, the first communication unit 416, the first user interface 418, the second control unit 434, the second communication unit 436, the second user interface 438, the second storage unit 446, or a combination thereof. For example, the first control unit 412 can be implemented to mark the point of interest 206 as possibly closed.

It has been discovered that the first mapper module 802 provides improved process performance with the first keys 812 and the first values 814 provided for subsequent processing by the first reducer module 804 to process vast amounts of data in parallel on large clusters of compute nodes.

It has also been discovered that the first reducer module 804 provides improved quality by generating the point pairs 816 when the time difference 822 is less than the time threshold 824 with the first arrival time 818 greater than the second arrival time 820 and the first identifier 826 of the point of interest 206 is the same as or similar to the second identifier 828 of the second point of interest 306 that is away from the point of interest 206.

It has further been discovered that the second mapper module 806 also provides improved process performance with the second keys 830 and the second values 832 provided for subsequent processing by the second reducer module 808 to process vast amounts of data in parallel on large clusters of compute nodes.

It has yet further been discovered that the second reducer module 808 also provides improved quality with the count 834 generated by the second reducer module 808 counting a number of the second values 832 of one of the second keys 830 and saving the one of the second keys 830 if the count 834 is greater than the count threshold 836.

It has yet further been discovered that the pattern label module 810 provides improved prediction by marking the point of interest 206 as possibly closed if the count 834 is greater than the count threshold 836.

The physical transformation of the point of interest 206 marked as invalid or closed results in movement in the physical world, such as people using the first device 102 of FIG. 1, the second device 106 of FIG. 1, or vehicles to get an alert from the notification 208 of FIG. 2 or FIG. 3 presented on the first device 102 or the second device 106 to avoid unnecessary driving to waypoints that possibly no longer exist or are closed, based on the operation of the navigation system 100 of FIG. 1. As the movement in the physical world occurs, the movement itself creates additional information that is converted back to the point of interest 206 or the second point of interest 306 that is marked as valid or opened for the continued operation of the navigation system 100 and to continue the movement in the physical world.

Thus, it has been discovered that the navigation system 100 of the present invention furnish or furnishes important and heretofore unknown and unavailable solutions, capabilities, and functional aspects for a navigation system with point of interest validation.

The navigation system 100 describes the module functions or order as an example. The modules can be partitioned differently. For example, the record module can be implemented with two separate modules. Each of the modules can operate individually and independently of the other modules.

The modules described can be implemented in hardware as hardware accelerators in the first control unit 412 or the second control unit 434. The modules described can be implemented in other hardware units in the first device 102 or the second device 106 but outside the first control unit 412 or the second control unit 434.

Figure 9:
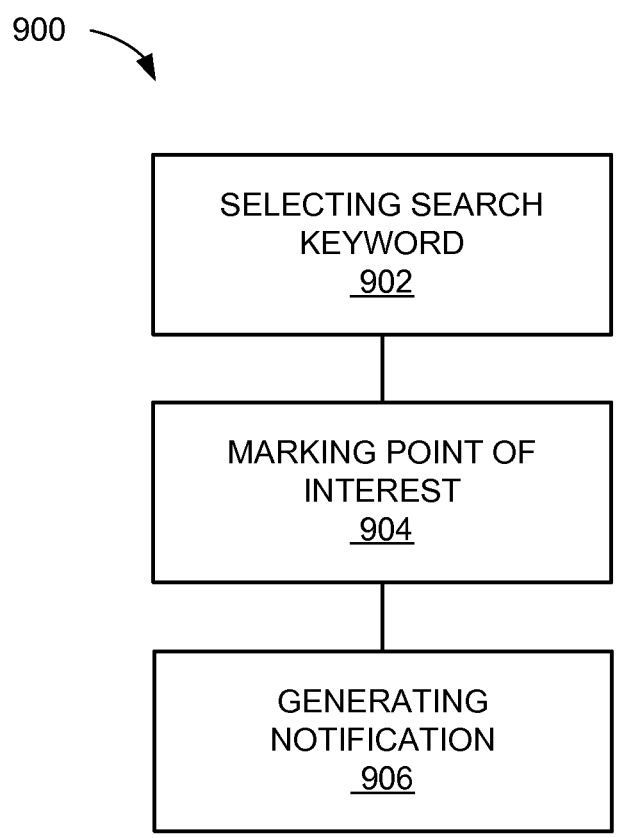
FIG. 9 is a flow chart of a method of operation of the navigation system in a further embodiment of the present invention.

Referring now to FIG. 9, therein is shown a flow chart of a method 900 of operation of the navigation system 100 in a further embodiment of the present invention. The method 900 includes: selecting a search keyword in a block 902; marking a point of interest as closed with the search keyword in a block 904; and generating a notification with the point of interest marked as closed for displaying on a device in a block 906.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   selecting, with a control unit, a search keyword;
   marking a point of interest as invalid with a search of the search keyword; and
   generating a notification with the point of interest marked as invalid for displaying on a device for the point of interest that has moved.

2. The method as claimed in claim 1 further comprising calculating a probability of the point of interest being closed.

3. The method as claimed in claim 1 wherein selecting the search keyword includes selecting a pivot indicator.

4. The method as claimed in claim 1 wherein marking the point of interest includes marking the point of interest as closed based on a latest review.

5. The method as claimed in claim 1 further comprising calculating a time difference between a first arrival time recorded at the point of interest and a second arrival time recorded at a second point of interest away from the point of interest.

6. A method of operation of a navigation system comprising:
   selecting, with a control unit, a search keyword;
   marking a point of interest as invalid with a search of the search keyword; and
   generating a notification with the point of interest marked as invalid for displaying on a device for identifying the point of interest as out of business.

7. The method as claimed in claim 6 further comprising:
   calculating a probability of the point of interest being closed; and
   wherein:
   marking the point of interest includes marking the point of interest as closed based on the probability.

8. The method as claimed in claim 6 wherein:
   selecting the search keyword includes selecting the search keyword as a pivot indicator; and
   marking the point of interest includes marking the point of interest as closed based on the pivot indicator and a neighbor word.

9. The method as claimed in claim 6 wherein marking the point of interest includes marking the point of interest as closed based on a latest review and a previous review.

10. The method as claimed in claim 6 further comprising:
    calculating a time difference between a first arrival time recorded at the point of interest and a second arrival time recorded at a second point of interest away from the point of interest; and
   wherein:
    marking the point of interest includes marking the point of interest as closed if the time difference is less than a time threshold.

11. A navigation system comprising:
    a control unit for implementing a select module for selecting a search keyword;
    a storage unit for implementing a search module, coupled to the select module, for marking a point of interest as invalid with a search of the search keyword; and
    a communication unit for implementing a generate module, coupled to the search module, for generating a notification with the point of interest marked as invalid for displaying on a device for the point of interest that has moved.

12. The system as claimed in claim 11 wherein the search module includes a probability calculation module, coupled to the select module, for calculating a probability of the point of interest being closed.

13. The system as claimed in claim 11 wherein the select module is for selecting a pivot indicator.

14. The system as claimed in claim 11 wherein the search module includes a combine module, coupled to the select module, for marking the point of interest as closed based on a latest review.

15. The system as claimed in claim 11 wherein the search module includes a first reducer module, coupled to the select module, for calculating a time difference between a first arrival time recorded at the point of interest and a second arrival time recorded at a second point of interest away from the point of interest.

16. The system as claimed in claim 11 wherein the generate module is for generating the notification for identifying the point of interest as out of business.

17. The system as claimed in claim 16 wherein the search module includes:
    a probability calculation module, coupled to the select module, for calculating a probability of the point of interest being closed; and
    a point label module, coupled to the probability calculation module, for marking the point of interest as closed based on the probability.

18. The system as claimed in claim 16 wherein:
    the select module is for selecting a pivot indicator; and
    the search module includes a review extraction module, coupled to the select module, for marking the point of interest as closed based on the pivot indicator and a neighbor word.

19. The system as claimed in claim 16 wherein the search module includes a combine module, coupled to the select module, for marking the point of interest as closed based on a latest review and a previous review.

20. The system as claimed in claim 16 wherein the search module includes a first reducer module, coupled to the select module, for calculating a time difference between a first arrival time recorded at the point of interest and a second arrival time recorded at a second point of interest away from the point of interest and marking the point of interest as closed if the time difference is less than a time threshold.

* * * * *